Aug. 12, 1969      L. L. SNYDER ETAL      3,461,009
PROCESS OF MOLDING A TANK
Filed Nov. 8, 1966                 5 Sheets-Sheet 1
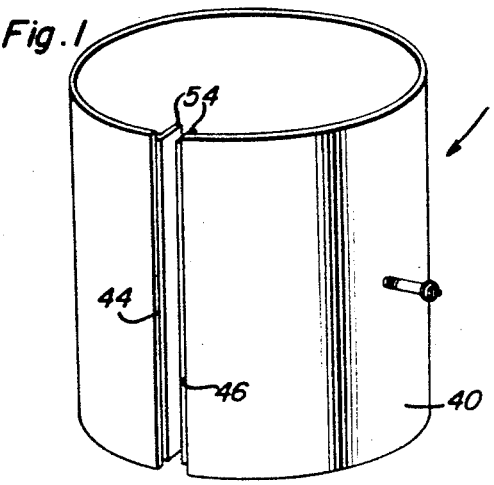
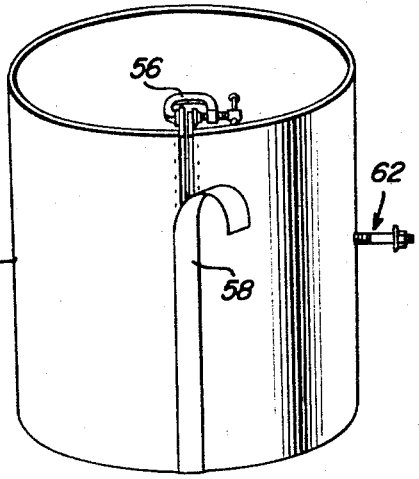
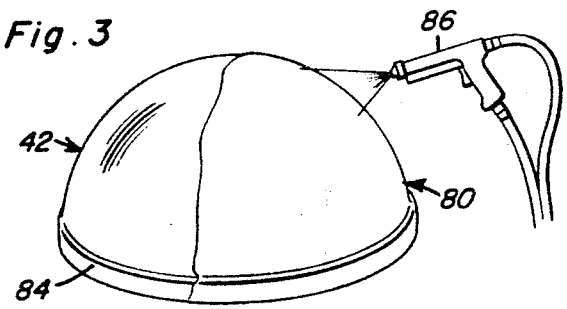
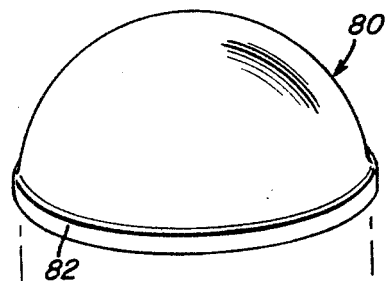
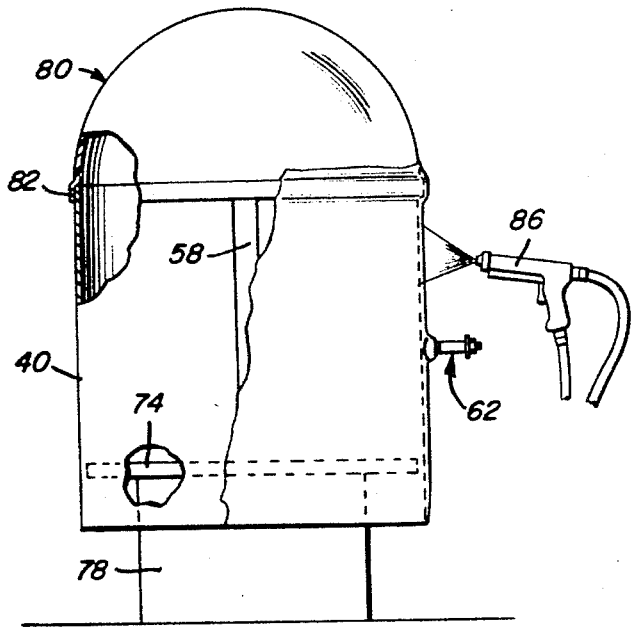
Larry L. Snyder
Mervin G. Snyder
INVENTORS

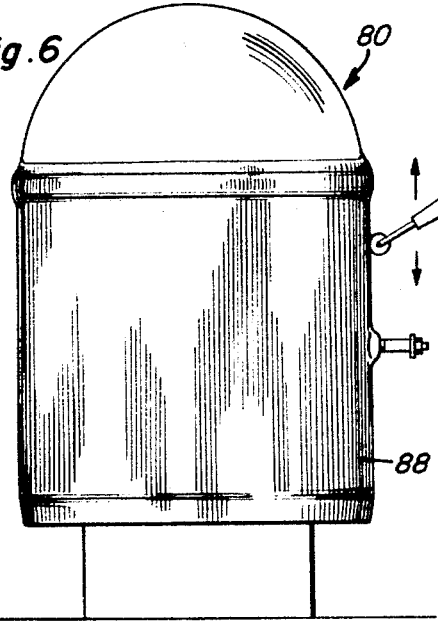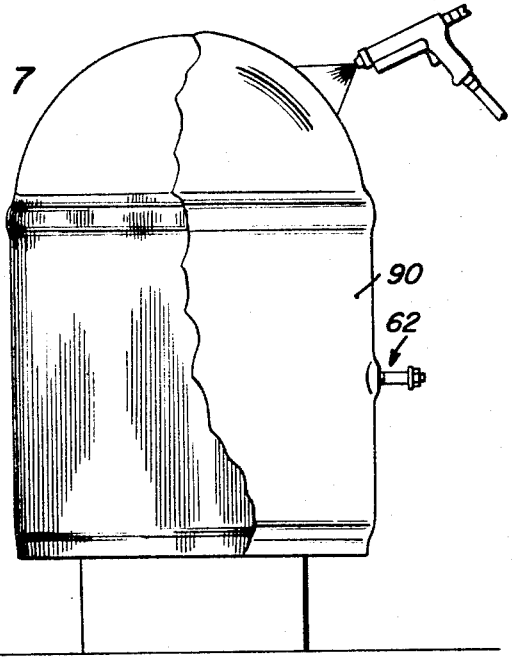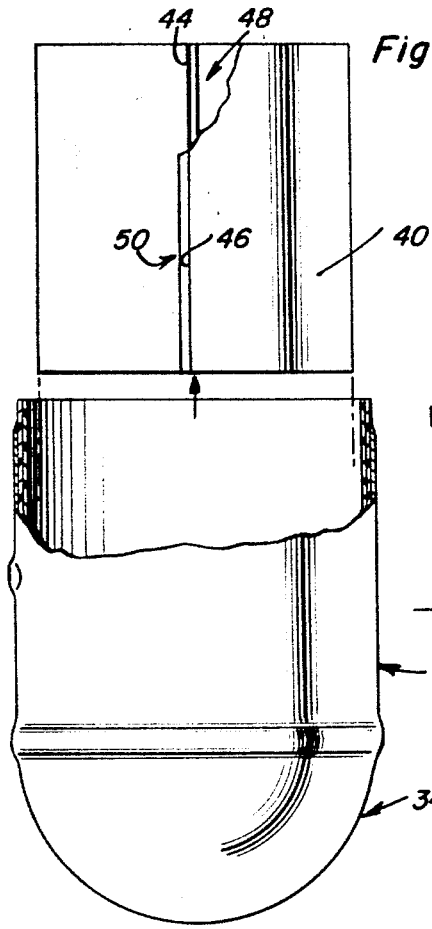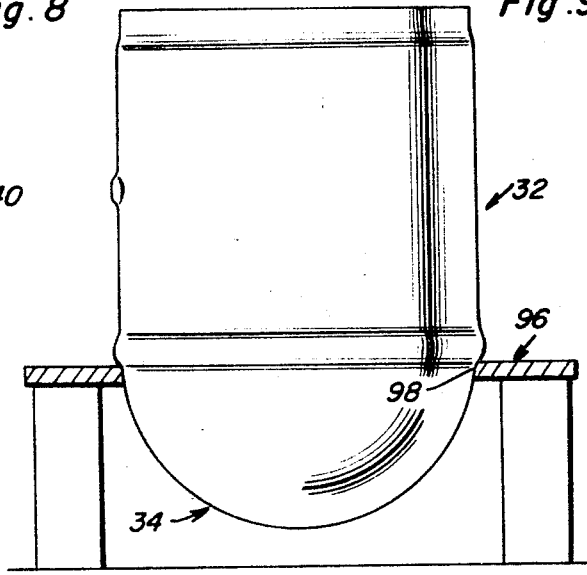

Aug. 12, 1969 L. L. SNYDER ETAL 3,461,009
PROCESS OF MOLDING A TANK
Filed Nov. 8, 1966 5 Sheets-Sheet 3

Larry L. Snyder
Mervin G. Snyder
INVENTORS

BY
Clarence A. O'Brien
and Harvey B. Jacobson
Attorneys

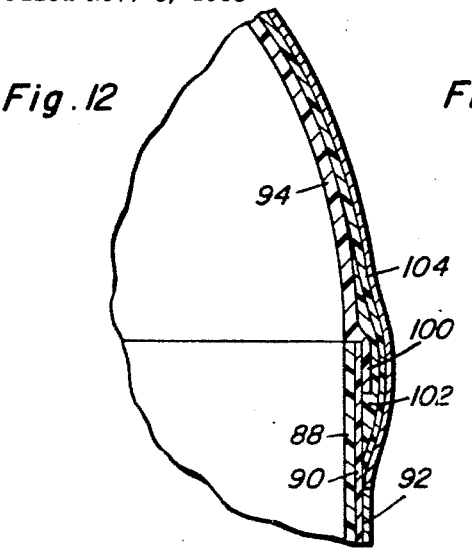
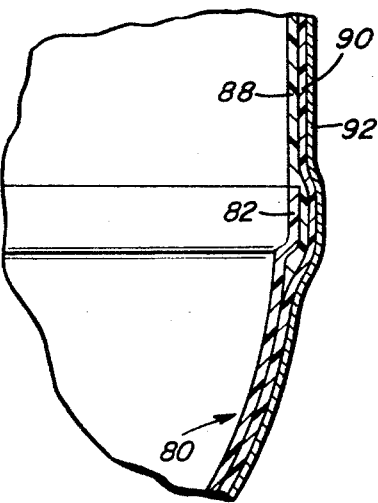
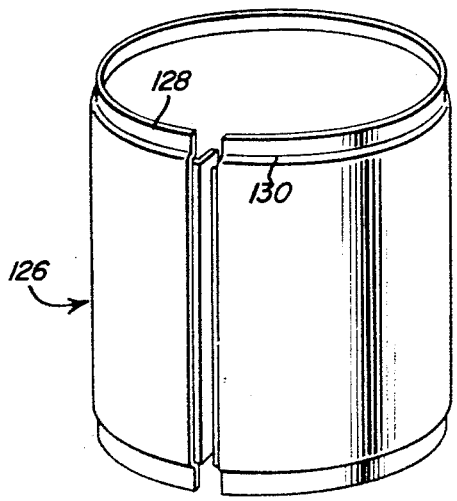
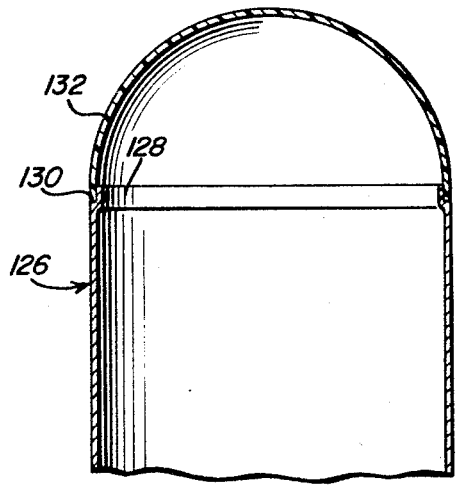
Larry L. Snyder
Mervin G. Snyder
INVENTORS Aug. 12, 1969  L. L. SNYDER ETAL  3,461,009
PROCESS OF MOLDING A TANK
Filed Nov. 8, 1966  5 Sheets-Sheet 5
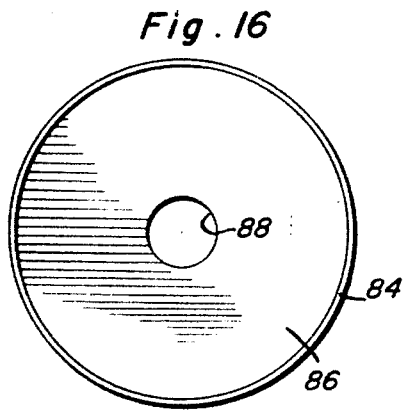
Fig. 16
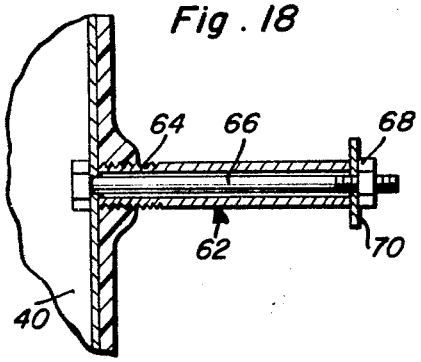
Fig. 18
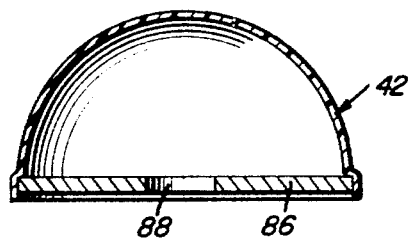
Fig. 17
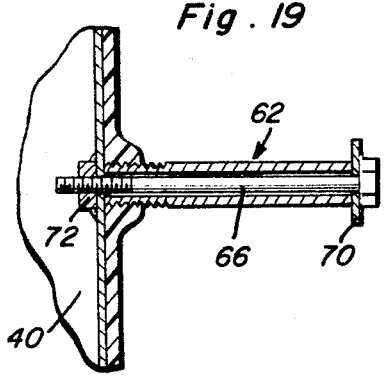
Fig. 19
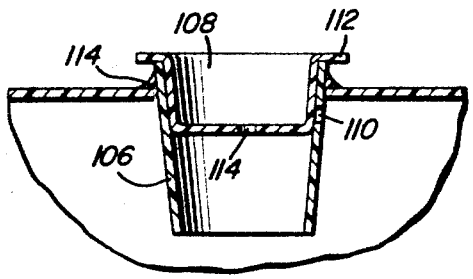
Fig. 21
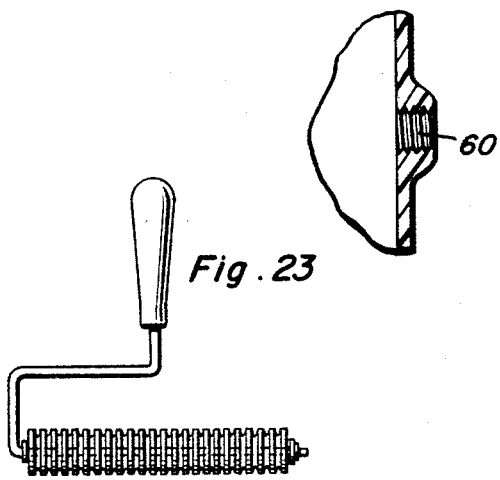
Fig. 20
Fig. 23
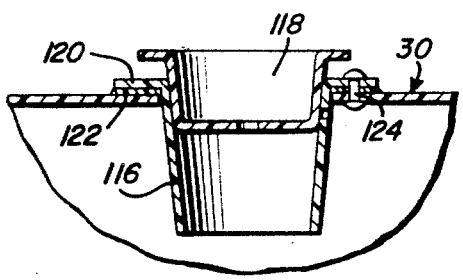
Fig. 22
Larry L. Snyder
Mervin G. Snyder
INVENTORS
BY Clarence A. O'Brien
and Harvey B. Jacobson
Attorneys United States Patent Office 3,461,009
Patented Aug. 12, 1969

3,461,009
PROCESS OF MOLDING A TANK
Larry L. Snyder, Lincoln, and Mervin G. Snyder, Waverly, Nebr. (both of 4620 Fremont, Lincoln, Nebr. 68504)
Filed Nov. 8, 1966, Ser. No. 592,839
Int. Cl. B29c 13/04
U.S. Cl. 156—69                                    11 Claims

ABSTRACT OF THE DISCLOSURE

A seamless molded tank including an elongated generally cylindrical body sealed by a pair of opposed normally hemispherical end caps. The body and end caps are of fiber glass reinforced plastic and are internally lined with a corrosion resistant cured resinous coating. Formation of the tank involves the utilization of a collapsible cylindrical mold as well as generally hemispherical end cap molds. The end caps are molded independently and one molded end cap is positioned on the cylindrical body mold for a molding of the body and a bonding of the end cap thereto. The body mold is then removed and the second end cap positioned on the end of the molded body opposed from the first end cap and intimately joined thereto.

---

The present invention generally relates to new and useful improvements in the construction of plastic storage tanks or containers and is more particularly concerned with a unique method and associated apparatus used in the construction of a tank.

It is a significant object of the instant invention to provide apparatus which enables the efficient construction of seamless tanks, in substantially any size, without the elaborate equipment normally associated with the construction of tanks of this general type.

In conjunction with the above, it is also an important object of the instant invention to provide apparatus, and an associated method, which enables the construction of a tank in a highly economical manner, while at the same time producing a perfectly formed closed end tank.

In addition, a significant object of the instant invention is to provide a novel method of tank construction which, in conjunction with the unique apparatus, enables the construction of a tank with only a minimum amount of process steps being involved and with the particular steps involved being extremely simple and capable of manual performance.

Likewise, it is a significant object of the instant invention to provide for the incorporation of tank fittings, filling openings and the like within the tank in an efficient manner corresponding in uniqueness and simplicity with the procedure utilized in the construction of the tank itself.

Specifically, it is an object of the instant invention to provide for the construction of a plastic tank through the utilization of a split elongated cylindrical mold in the formation of the body of the tank and two generally hemispherical shaped molds in separately forming the tank end caps. One of the sparately formed end caps is mounted on the cylindrical mold so as to become an integral part of the formed tank body, the second end cap being subsequently mounted and integrally bonded to the formed body after the removal of the cylindrical mold. The necessary tank fittings will be provided for during the molding process while the filling openings or the like required will be provided for subsequent to the completion of the molding of the tank itself through the utilization of independently molded sleeves secured within appropriate openings in the tank in conjunction with closure caps therefor. The actual molding process will involve, after the application of a suitable release layer, the spraying of a layer of fiber glass reinforced plastic over the mold and, after a partial curing of this layer, the spraying of a resin layer which, in conjunction with the partially cured fiber glass reinforced layer, produces a homogeneous structure. Finally, a wax solution is sprayed on so as to provide a protective coating which will also act as a release coating preventing the adherence of further resin and/or other material which might come in contact therewith during, as an example, the mounting of the filling opening.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the cylindrical mold utilized in the formation of the body of the tank;

FIGURE 2 illustrates an initial step in the preparation of the cylindrical mold;

FIGURE 3 is a perspective view illustrating a partial preparation of a typical end cap on the separate mold provided therefor;

Figure 10:
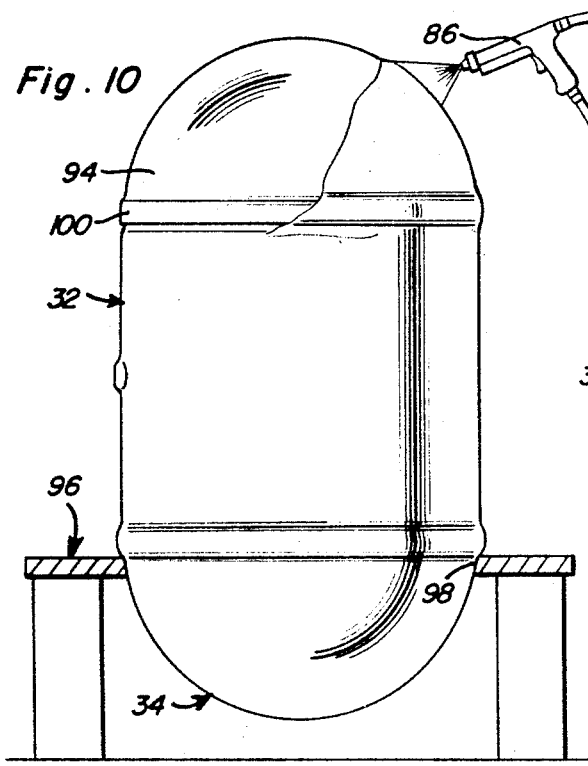
Figure 11:
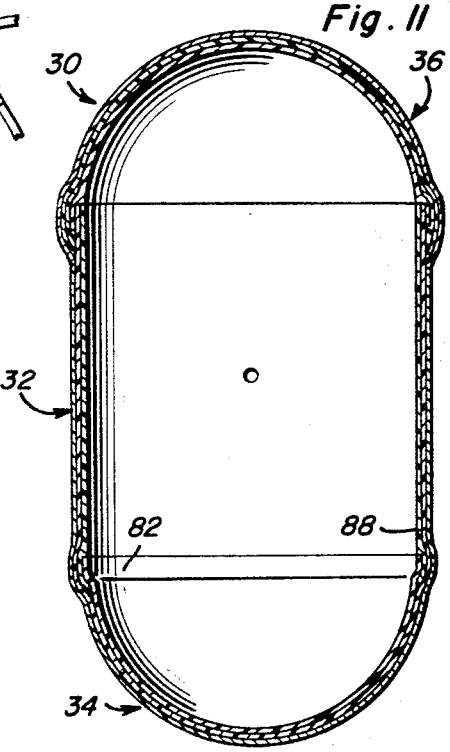
Figure 14:
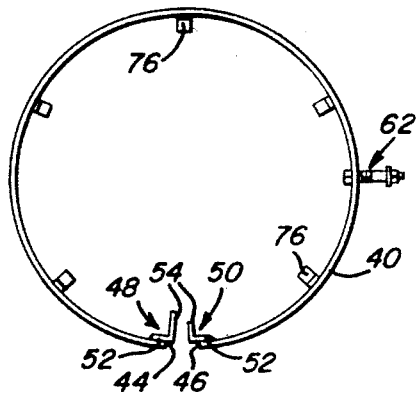
Figure 15:
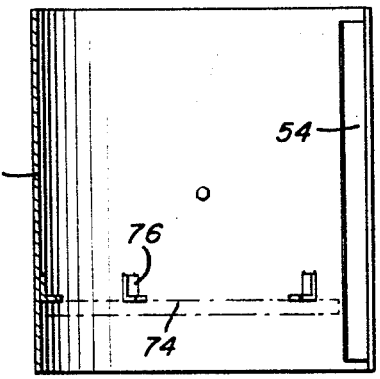

FIGURE 4 schematically illustrates the removal of the end cap from the end cap mold;

FIGURE 5 illustrates the application of the initial fiber glass reinforced plastic layer to the cylindrical mold and the integral bonding of the first end cap thereto;

FIGURE 6 illustrates the step of rolling the fiber glass layer;

FIGURE 7 illustrates the subsequent step of applying the resin layer;

FIGURE 8 illustrates the collapsed cylindrical mold being removed from the formed tank body;

FIGURE 9 illustrates the formed tank body and the first end cap position for reception of the second end cap;

FIGURE 10 illustrates the second end cap mounted on the formed body and the application of the final layers;

FIGURE 11 is a vertical cross-section through the completed tank;

FIGURE 12 is an enlarged partial cross-section detailing the construction of the tank between the cylindrical body and the second end cap;

FIGURE 13 is a partial cross-sectional view detailing the tank construction between the cylindrical body and the first end cap;

FIGURE 14 is a top plan view of the cylindrical mold;

FIGURE 15 is a vertical cross-sectional view of the cylindrical mold;

FIGURE 16 is a bottom plan view of an end cap mold;

FIGURE 17 is a vertical cross-sectional view through an end cap mold;

FIGURE 18 is a cross-sectional view detailing one manner of providing for an internally threaded aperture in the molded tank for the accommodation of a tank fitting;

FIGURE 19 illustrates another manner of providing for the accommodation of a tank fitting;

FIGURE 20 illustrates an internally threaded aperture formed in accordance with the structure of FIGURES 18 and 19 for the accommodation of a fitting;

FIGURE 21 illustrates one manner of providing a filler opening fitting;

FIGURE 22 illustrates a second form of filler opening fitting;

FIGURE 23 illustrates a typical grooved roller utilized as indicated in FIGURE 6;

FIGURE 24 is a perspective view of a modified form of split cylindrical mold for the tank body;

FIGURE 25 illustrates a modified form of end cap mold; and

FIGURE 26 illustrates a preformed end cap, constructed by using the mold of FIGURE 25, mounted on the mold of FIGURE 24 with the joint therebetween being substantially smooth so as to avoid the hump which results from the utilization of the molded end cap of FIGURE 4.

Referring now more specifically to the drawings, reference numeral 30 has been used to designate the completed tank or container, illustrated in cross-section in FIGURE 11. This tank 30 consists basically of a cylindrical elongated body 32 and first and second end caps 34 and 36. These end caps 34 and 36 are shown as being hemispherical, although incorporation of cylindrical extensions therein or the provision of generally flat end caps is also contemplated.

The apparatus utilized in the formation of the tank 30 includes a mold 38 in the nature of a split sheet metal cylinder 40 and a pair of end cap molds utilized in the molding of the end caps 34 and 36, only one such mold 42 having been specifically illustrated.

The longitudinally split metal body mold sheet 40 has the split defining edges 44 and 46 thereof reinforced by a pair of angles 48 and 50 secured to the inner surface of the cylindrical sheet 40 along these edges 44 and 46 as will be best appreciated from FIGURES 1 and 14. It will be noted that each of the angles 48 and 50 has one leg 52 thereof overlying the inner surface of the sheet 40 and projecting laterally beyond the corresponding edge 44 or 46. In this manner, when the cylindrical sheet 40 is collapsed for removal from the formed tank body 32, there is no danger of the thin edges of the mold catching on each other. Further, an abutment of the rigid angles 48 and 50 against each other facilitates a proper alignment of the edges 44 and 46 and a formation of a perfect cylinder.

Both of the angles 48 and 50 also include inwardly projecting legs 54 with the leg 54 associated with the angle 48 being of a slightly greater width than the corresponding leg 54 associated with the angle 50. In this manner, the longer leg 54 can easily be grasped to inwardly pull the edge 44 when collapsing the body mold 38 for removal as illustrated in FIGURE 8.

In preparing the cylindrical metal sheet 40, for the molding process, the angle legs 54 are abutted against each other with the sheet edges 44 and 46 in circumferential alignment with each other. Next, several suitable easily released clamps 56 are utilized within the mold sheet 40, noting FIGURE 2, for clamping the legs 54 of the adjacent edge angles 48 and 50 together in a manner whereby a closed cylinder is defined. Finally, the seam defined by the slightly spaced split edges 44 and 46 is covered by a suitable strip of masking tape 58.

At this time, if internally threaded apertures 60, noting FIGURES 18, 19 and 20, are to be provided within the cylindrical tank body 32, means is provided on the cylindrical metal sheet 44 for the formation thereof during the molding process. These internally threaded apertures 60 will be used to attach various fittings as needed. The means for defining the aperture 60 will comprise an elongated pipe section 62 having an externally threaded inner end 64 abutted against the cylinder 40 with the pipe being rigidly bolted to the molding cylinder 40 by the utilization of an elongated bolt 66 extending through the pipe 62 and the underlying portion of the cylinder 40. This bolt 66 may, as illustrated in FIGURE 18, extend outwardly from the interior of the cylinder 40 and have a nut 68 threaded on the outer end thereof and bearing against the pipe 62 through a suitable washer 70. On the contrary, the bolt 66 may extend inwardly from the outer end of the pipe 62 and have the inner end thereof threaded within a suitable nut 72 either loosely received within the cylinder 40 or welded therein. This latter arrangement is shown in FIGURE 19 wherein it will be noted that a washer 70 is also utilized between the outer or headed end of the bolt 66 and the outer end of the pipe 62. Any holes through the metallic cylinder 40 not specifically being utilized for the accommodation of a pipe mounting bolt 66 will be taped over from the inside of the cylinder 40. If such holes have internally welded nuts 72 associated therewith, when such holes are not being used short bolts can be threaded therein so as to present a substantially smooth outer surface to the cylinder 40.

The mounting of the cylinder 40 in a position to receive the sprayed layers includes the provision of a cylindrical block 74 within the bottom of the cylinder 40 and in engagement with a plurality of tabs 76 welded or otherwise secured to the inner surface of the cylinder 40. This cylindrical block 74, made of wood, steel or plastic, assists in maintaining the cylindrical shape of the cylinder 40, and at the same time provides a base for the support of the cylinder 40 during the spray operation on a vertically extending suitable stand 78 which is received within the lower end of the cylinder 40 and has the cylinder supporting block 74 seated on the upper end thereof as illustrated in FIGURE 5.

Prior to a molding of the tank body 32, a preformed end cap shell 80 is mounted thereon. This end cap shell 80 can be of any shape, for example, hemispherical, hemispherical with a cylindrical extension, semi-flat or flat and is initially formed utilizing the mold 42. The mold 42 is of course of a size and shape so as to define the required end cap shell 80. With reference to FIGURE 5, it will be noted that the end cap shell 80 is to include an offset lip 82 peripherally thereabout for seating over the upper end of the cylinder 40. As such, the mold 42, formed of a suitable fiber glass reinforced plastic, is also to include an offset lip 84. Referring to FIGURES 16 and 17 in particular, it will be noted that the mold 42 also includes an internal cylindrical wood brace 86 having a central hole 88 cut therein so as to allow for heat dissipation and expansion and contraction. Inasmuch as the depending gap shell lip 82 is to fit snugly about the upper end of the cylinder 40 with the portion of the shell 80 immediately thereabove on the upper edge of the cylinder 40, it will be appreciated that the inside diameter of the lip portion of the shell is to be equal to or only slightly greater than the outside diameter of the cylinder 40.

The mold 42 is provided with a polished surface waxed and/or coated with a suitable parting film or release. In forming the end cap shell 80, fiber glass reinforced plastic is sprayed over the mold 42 in vertically applied layers utilizing a suitable conventional spraying gun or mechanism 86. The operator of the gun 86 will move the gun vertically, or perpendicularly to the edge of the end cap mold 46 with less material being applied in the area of the offset lip 82 in order that this area 82 might be left thinner so as to be more flexible and manageable in assembling the cap shell 80 on the metal cylinder 40. Next, the layer or layers of fiber glass reinforced plastic are rolled utilizing metal grooved rollers, such as illustrated in FIGURE 23, so as to compress and smooth the fiber glass layer, removing trapped air and preventing the appearance of voids. After the end cap shell 80 has cured it is removed from the mold 42 and mounted on the cylinder 40 preparatory to a forming of the tank body 32 and an integral adherence of the shell 80 thereto.

In the forming of the body 32, if aperture defining pipes 62 are being utilized, lengths of fiber glass roving, presaturated with catalyzed resin, are wrapped tightly around the threaded end 64 of each pipe 62, thereby assuring well formed and functional threads for the attachment of necessary fittings upon a removal of the pipe from the finished tank 30.

As an initial step, the cylindrical mold 40, having a smooth metallic outer surface, is waxed or provided with a release, with the seam sealing masking tape 58 also being waxed along with any tape sealed holes, as well as the exposed pipes 62 which may have been previously taped to avoid any adherence of the resinous material thereto. Next, fiber glass reinforced plastic is sprayed on the cylinder 40 and lapped over the end cap shell 80 with this layer being indicated by reference numeral 88, reference being particularly had to the cross-sectional detail of FIGURE 13 wherein the tank is inverted, relative to its position in FIGURE 5, as it will appear in the final step. The lapping of the fiber glass reinforced plastic layer 88 over the end cap shell 80 assure an intimate and proper bonding therewith. This spraying step is followed by a rolling step wherein metal grooved rollers, noting FIGURE 6, are utilized in smoothing the layer 88 and removing the trapped air. Incidentally, the fiber glass reinforced plastic, as an example, may consist of a relatively rigid suitable polyester or epoxy resin reinforced with fiber glass staple or roving and provided with an appropriate catalyst. After the layer 88 has been allowed to partially cure, resin is sprayed over the whole cap shell 80 as well as the cylindrical layer 88 so as to form a homogeneous layer therewith, notwithstanding its indication as a distinct layer 90 for purposes of illustration in the drawings. After a curing of the resin, a protective wax solution is sprayed on all but the lower portion of the cylinder 40 where the second end cap 36 will be defined and an additional fiber glass reinforced plastic layer applied. Finally, excess fiber glass reinforced plastic material or flash is trimmed from the formed unit with a knife.

After the setting of the sprayed layers, the cylindrical bottom insert 74, stand 78 and pipe or pipes 62 are removed, the removal of the pipe or pipes 62 involving, in addition to a removal of the clamping bolt 66, an unscrewing of the pipes 62 thereby leaving the desired internally threaded aperture 60. Next, the clamps 56 interlocking the edge angles 48 and 50 are removed and the cylinder edge 44 moved inwardly, through a grasping of a longer angle leg 54 on the angle member 48, and in an overlapping manner relative to the edge 46 so as to effect a collapsing of the cylinder 40, this being illustrated in FIGURE 8, thus enabling it to be easily slipped from the formed tank body 32 comprising the layers 88 and 90, as well as the wax layer 92. During this collapsing of the cylinder 40, it will be appreciated that the masking tape 58 will easily strip therefrom. After the cylinder 40 is removed, all tape and foreign matter or material is removed from the cylinder as well as the inside of the body 32 and the interior surfaces of the formed unit are thoroughly inspected.

The second end cap 36 also includes a fiber glass reinforced plastic end cap shell 94 differing from the end cap shell 80 only in the provision of a slightly greater internal diameter in the area of the corresponding offset lip 100 for the accommodation of the offset lip over the unwaxed open end of the cylinder body 32 defined by the layers 88 and 90. This shell 94 is to be formed in the same manner described supra with regard to the shell 80, utilizing a similar end cap mold 42.

In order to receive the end cap shell 94, the unit thus far formed is inverted and placed on a stand 96 having a central hole 98 defined therein for the reception of the first formed end cap 34 in a manner whereby the unit is positioned vertically. The end cap shell 94, noting FIGURE 10, is then positioned on the upper end of the body 32 with the shell lip portion 100 telescopically overlapping the unwaxed upper end of the formed body 32. Fiber glass reinforced plastic is then sprayed over the lap between the body 32 and the cap shell 94, this layer being indicated by reference numeral 102 in FIGURES 11 and 12. This lapping layer 102 is then rolled utilizing a grooved metal roller as illustrated in FIGURE 23, and allowed to partially cure. Subsequent to a partial curing of the layer 102, one or two resin coats 104 are sprayed over the end cap shell 94, the layer 102 and a short portion of the body 32, after which a protective wax solution is sprayed over the same areas, thereby providing an integral substantially homogeneous unit, illustrated in vertical cross-section in FIGURE 11. If the tank 30, or a particular area of the tank, is to be subjected to extra stress, the tank is formed as above, except that the portions thereof expected to be under stress are not given the extra coat of resin and wax solution. Rather, these areas are covered by a fiber glass woven roving or a heavy fiber glass cloth which is saturated with a catalyzed resin. Air and excess resin are removed from this area by rolling with metal grooved rollers or by a back and forth motion with a squeege made of rubber or other suitable material. Then, a layer of fiber glass reinforced plastic is sprayed over this area, rolled, resined and coated with a wax solution as in the prior operation. In many instances, just the extra layer of fiber glass reinforced plastic sprayed over the area, without the woven roving or cloth, will be sufficient. In case a tank is expected to contain a corrosive substance, a layer of catalyzed resin, a gel coat, or a mixture of both, is applied to the molds, both the end cap molds and the body mold, and allowed to set prior to the application of the initial fiber glass reinforced plastic layer.

Upon the completion of the molding of the tank 30, the tank can then be drilled and/or sawed so as to define appropriate openings for other fittings, such as for that associated with the filler opening as illustrated in FIGURE 21. These fittings will normally be of preformed plastic. At this time markings can also be stenciled or otherwise placed on the surface of the normally translucent tank 30 so as to indicate graduated capacities. The fitting associated with the filler opening will include both a sleeve 106 and a cap 108. The sleeve is to be provided with tapered sides with the lower portion thereof extending into the interior of the tank so as to act as an anti-splash and fill opening and beyond the exterior of the tank to keep out any foreign material. The sleeve 106 will include a hole 110 drilled through the inner portion thereof within the tank so as to permit escape of air as the tank is filled to the level of the bottom of the sleeve. The cap 108 is of a size so as to be snugly received within the outer end of the sleeve 106 and has a peripheral lip 112 sufficiently wide so as to keep the cap from being drawn into the sleeve. In addition, the cap has a central small air hole 114 drilled in the bottom thereof so as to permit a flow of air to the tank as the liquid is being withdrawn therefrom through suitable outlet or outlets.

The sleeves 106 are preferably molded of fiber glass reinforced plastic and are formed over the exterior surface of a wax coated paper cup or the like. The size of this cup will of course vary with the requirement of the opening. In actual practice several cups are mounted on a board and the fiber glass reinforced plastic is sprayed around the lateral surface thereof with the fiber glass reinforced plastic subsequently being rolled out and smoothed with metal grooved rollers and brushes.

The caps 108 are similarly molded of fiber glass reinforced plastic, this being done inside a plastic cup or the like of appropriate diameter to fit within the associated sleeve. These cap forming cups will be mounted in holes in a board and the fiber glass reinforced plastic sprayed into the cups and onto the board surface surrounding the cups to form lips 112. These caps are also rolled and/or brushed to remove the trapped air and form a laminated part.

When the sleeves and caps are removed from the cups, they are trimmed and drilled using appropriate jigs. A sleeve 106 is then placed into a hole of appropriate diameter in the tank 30 and a length of fiber glass roving 114, presaturated with catalyzed resin and wax solution so as to provide a tack-free cure, is wrapped several times around the joint of the tank and the outer extension of the sleeve 106.

FIGURE 22 illustrates a modified form of fitting molded of thermoplastic material rather than the thermosetting material described heretofore. This fitting also includes a sleeve 116 and an associated cap 118, both tapered and drilled in the same manner as the sleeve 106 and cap 108. The sleeve 116 differs from the sleeve 106 in the provision of an enlarged circumferential lip or flange 120 engaged with the outer surface of the tank and molded so as to have the same curvature as the tank itself. A suitable caulking compound 122 is placed about the opening in the tank 30, the sleeve 116 positioned, rivet holes drilled through the lip 120 and adjacent portion of the tank, and pop rivets or the like 124 engaged therethrough so as to secure the sleeve 116 to the tank 30, thereby completing the installation.

While the annular bulges defined between the end caps 34 and 36 and the cylindrical body portion 32 have been slightly exaggerated for purposes of illustration, it is frequently desirable that the bulges in this area be eliminated completely so as to allow for certain mounting arrangements which might be used in conjunction with the tanks. Accordingly, noting FIGURES 24, 25 and 26, a slightly modified apparatus is illustrated for use as an alternative to the previously described apparatus. Basically, the modified apparatus will include a body molding split metal cylinder 126 wherein the opposite ends 128 thereof are offset inwardly so as to define seating shoulders 130 for the reception of a preformed end cap shell 132 in a manner which defines a smooth joint between the shell 132 and the cylindrical mold 126. The end cap shell 132 will in turn be formed on an appropriate fiber glass reinforced plastic end cap mold 134 having no offsets, similar to the offset peripheral lip 84 of the mold 32, thereby presenting a smooth continuous surface. While both ends 128 may be offset an equal amount, thereby requiring that the second end cap shell be slightly larger so as to accommodate the partially formed lower end of the body, it is contemplated that the lower end of the cylinder 126 be offset to a greater degree, thereby enabling the use of an equal size end cap on the partially formed lower end of the body which will, upon the partial forming thereof, approximate the size of the upper offset end.

From the foregoing, it should be appreciated that a unique method of construction of a plastic container has been set forth in conjunction with associated apparatus which enables the rapid and economical formation of the sealed container.

The foregoing is considered as illustrative only of the principles of the invention.

What is claimed as new is as follows:

1. The process of constructing a molded plastic tank comprising the steps of providing a body mold, mounting a preformed end cap shell on one end of said body mold, molding a tank body about said body mold and in overlapping relation to at least a portion of said end cap shell, removing said body mold, mounting a second end cap shell on the exposed end of the tank body, and intimately securing said second end cap shell to the tank body.

2. The process of claim 1 including the formation of a fitting within said tank comprisng the steps of defining an aperture through said tank, inserting a sleeve through said aperture, and sealing said sleeve to said tank peripherally thereabout with a substantial portion of said sleeve projecting into the interior of said tank.

3. The process of claim 1 wherein the molding of the tank body includes the steps of providing a layer of fiber glass reinforced plastic about said body mold and in overlapping relation to the adjoining portion of the first end cap shell, and applying a resin layer over the plastic covered body mold and the entire first end cap shell.

4. The process of claim 3 wherein the intimate securing of the second end cap shell to the tank body includes the steps of applying a layer of fiber glass reinforced plastic over the adjoining portions of the tank body and second end cap shell, and applying a layer of resin over the last-mentioned layer of fiber glass reinforced plastic and the entire second end cap shell.

5. The process of claim 4 including the steps of applying a layer of wax over the first applied layer of resin with the layer of wax terminating short of the exposed end of the tank body, and applying a layer of wax over the second applied layer of resin down to the first layer of wax.

6. The process of constructing a molded plastic tank comprising the steps of independently molding a pair of fiber glass reinforced end cap shells, mounting one of said shells on one end of a body mold, applying a layer of fiber glass reinforced plastic over said body mold and the adjacent portion of said one shell, rolling said layer, applying a layer of resin over said first layer and the remainder of said one shell, removing the body mold, mounting the second shell on the open end of the molded body, applying a layer of fiber glass reinforced plastic over the adjacent portions of the second shell and molded body, rolling said last-mentioned layer, and applying a layer of resin over said last-mentioned layer and the entire second shell.

7. The process of claim 6 including the step of applying a layer of a protective substance selected from the group consisting of a catalyzed resin, a gel coat, and a mixture of catalyzed resin and gel, prior to the step of applying the layer of fiber glass reinforced plastic in both instances.

8. The process of claim 3 including the step of applying a layer of a protective substance selected from the group consisting of a catalyzed resin, a gel coat, and a mixture of catalyzed resin and gel, prior to the step of applying the layer of fiber glass reinforced plastic.

9. The process of claim 8 wherein the intimate securing of the second end cap shell to the tank body includes the steps of applying a layer of fiber glass reinforced plastic over the adjoining portions of the tank body and second end cap shell, and applying a layer of resin over the last-mentioned layer of fiber glass reinforced plastic and the entire second end cap shell.

10. The process of claim 9 including the molding of said end cap shells including the steps of providing end cap molds, applying a layer of a protective substance selected from the group consisting of a catalyzed resin, a gel coat, and a mixture of catalyzed resin and gel, allowing the protective substance to set, and applying a layer of fiber glass reinforced plastic over each of the layers of protective substance.

11. The process of claim 1 including the formation of at least one internally threaded aperture in the tank comprising the steps of providing an elongated pipe section having an externally threaded inner end, removably mounting the elongated pipe section on the body mold with the threaded end thereof abutted against the body mold, wrapping the threaded inner end of the pipe section with resin saturated fibers, and, subsequent to the formation of the tank itself, releasing and unthreading the pipe section leaving an internally threaded aperture molded within the tank.

References Cited

UNITED STATES PATENTS 3,155,133  11/1964  Villemonte de la Clergene
156—69

ROBERT F. WHITE, Primary Examiner

R. SHEAR, Assistant Examiner

U.S. Cl. X.R.

156—242, 293; 264—250, 255, 262, 263, 318